(12) United States Patent
Gao et al.

(10) Patent No.: US 11,991,035 B2
(45) Date of Patent: May 21, 2024

(54) METHOD AND DEVICE FOR SENDING AND DETECTING SYNCHRONOUS SIGNAL

(71) Applicant: China Academy of Telecommunications Technology, Beijing (CN)

(72) Inventors: Xuejuan Gao, Beijing (CN); Fang-Chen Cheng, Beijing (CN); Xueming Pan, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 8 days.

(21) Appl. No.: 16/325,182

(22) PCT Filed: May 24, 2017

(86) PCT No.: PCT/CN2017/085778
§ 371 (c)(1),
(2) Date: Feb. 12, 2019

(87) PCT Pub. No.: WO2018/028270
PCT Pub. Date: Feb. 15, 2018

(65) Prior Publication Data
US 2019/0173721 A1  Jun. 6, 2019

(30) Foreign Application Priority Data
Aug. 12, 2016  (CN) .......................... 201610666277.7

(51) Int. Cl.
*H04L 27/26* (2006.01)
(52) U.S. Cl.
CPC ...... *H04L 27/2666* (2013.01); *H04L 27/2676* (2013.01)

(58) Field of Classification Search
CPC ............... H04L 27/2613; H04L 5/0094; H04L 27/2602; H04L 27/2657; H04L 27/2666;
(Continued)

(56) References Cited

U.S. PATENT DOCUMENTS 7,346,365 B1 *  3/2008  Hovers .................. H01Q 1/246
342/382
10,555,280 B2 *  2/2020  Takeda .................. H04W 72/04
(Continued)

FOREIGN PATENT DOCUMENTS

CN         101005477 A     7/2007
CN         101018221 A     8/2007
(Continued)

OTHER PUBLICATIONS

3GPP TSG RAN WG1 #86bsi, Lisbon, Portugal, Oct. 10-14, 2016 R1-1608785, Title: NR Multi-stage Synchronization Channel Design, Source: CATT (Year: 2016).*
(Continued)

*Primary Examiner* — Christopher T Wyllie
(74) *Attorney, Agent, or Firm* — Kilpatrick Townsend & Stockton LLP

(57) ABSTRACT

Disclosed in the present invention are a method and device for transmitting and detecting a synchronous signal, which is used to solve the problem that there is currently no clear solution as to how should a terminal detect a synchronous signal when multiple types of base-band numerology are defined in a new wireless communication system. The method comprises: a terminal determining a base-band numerology used to detect a synchronous signal; the terminal detecting the synchronous signal according to the determined base-band numerology. The terminal first determines a base-band numerology used to detect a synchronous signal before detecting said synchronous signal, and then detects
(Continued)

the synchronous signal according to the determined baseband numerology, so as to identify the base-band numerology used in the synchronous signal transmission in future communication systems which support multiple types of base-band numerology, thereby correctly detecting the synchronous signal.

10 Claims, 6 Drawing Sheets

(58) Field of Classification Search
CPC .. H04L 27/2655; H04L 5/003; H04L 27/2662
See application file for complete search history.

(56) References Cited

U.S. PATENT DOCUMENTS

| | | | |
|---|---|---|---|
| 10,757,637 B2* | 8/2020 | Harada | H04W 48/16 |
| 11,394,596 B2* | 7/2022 | Gao | H04W 72/0453 |
| 11,483,820 B2* | 10/2022 | Tang | H04L 1/0075 |
| 11,716,184 B2* | 8/2023 | Zhang | H04L 5/005 |
| | | | 370/329 |
| 2008/0205351 A1 | 8/2008 | Lindoff et al. | |
| 2014/0120926 A1* | 5/2014 | Shin | H04W 48/12 |
| | | | 455/450 |
| 2016/0056871 A1* | 2/2016 | Kakishima | H04B 7/0634 |
| | | | 370/336 |
| 2016/0353453 A1* | 12/2016 | Au | H04L 5/0051 |
| 2017/0026938 A1* | 1/2017 | Onggosanusi | H04W 24/10 |
| 2017/0118054 A1* | 4/2017 | Ma | H04L 27/2607 |
| 2017/0245165 A1* | 8/2017 | Onggosanusi | H04L 5/0057 |
| 2017/0251460 A1* | 8/2017 | Agiwal | H04B 7/0617 |
| 2017/0332335 A1* | 11/2017 | Au | H04W 52/38 |
| 2018/0007673 A1* | 1/2018 | Fwu | H04W 72/044 |
| 2018/0176900 A1* | 6/2018 | Rong | H04W 28/0247 |
| 2019/0029003 A1* | 1/2019 | Takeda | H04W 28/18 |
| 2019/0081832 A1* | 3/2019 | Marinier | H04W 74/004 |
| 2019/0104551 A1* | 4/2019 | Deenoo | H04L 5/0053 |
| 2019/0141752 A1* | 5/2019 | Kim | H04B 7/0617 |
| 2019/0173721 A1* | 6/2019 | Gao | H04L 27/26025 |
| 2021/0306198 A1* | 9/2021 | Gao | H04W 72/0453 |
| 2022/0210844 A1* | 6/2022 | MolavianJazi | H04W 74/0866 |
| 2023/0403113 A1* | 12/2023 | Zhang | H04L 1/18 |

FOREIGN PATENT DOCUMENTS

| | | |
|---|---|---|
| CN | 101499989 A | 8/2009 |
| CN | 101552762 A | 10/2009 |
| CN | 101636992 A | 1/2010 |
| CN | 101707583 A | 5/2010 |
| CN | 101822013 A | 9/2010 |
| JP | 2010519838 A | 6/2010 |
| KR | 20090113893 A | 11/2009 |
| WO | 2016071148 A1 | 5/2016 |

OTHER PUBLICATIONS

TSG-RAN WG1 #48bis, 'Synchronization signals for 7.5 kHz subcarrier spacing', R1-071582, Malta, Mar. 26-30, 2007.
3GPP TSG RAN WG1 Meeting #82bis, 'Synchronisation Signal Design Principles for NB-IoT', R1-155879, Malmö, Sweden, Oct. 5-9, 2015.
3GPP TSG RAN WG1 #86bis, 'NR Multi-stage Synchronization Channel Design', R11608785, Lisbon, Portugal, Oct. 10-14, 2016.
3GPP TSG-RAN WG2 Meeting #94, 'Initial access in NR', R2-163923, Nanjing, China, May 23-27, 2016.
Jasper Meynard P. Arana, et al., 'Handover Measurement for Millimeter Wave Cellular System with Beamforming', School of Electrical and Electronics Engineering, Chung-Ang University, Seoul, Korea.
LG Electronics: "CSG Flag in Physical Cell ID", 3GPP TSG RAN WG1 #54, R1-082911, Jeju, Korea, Aug. 18-22, 2008.

* cited by examiner

METHOD AND DEVICE FOR SENDING AND DETECTING SYNCHRONOUS SIGNAL

This application is a National Stage of International Application No. PCT/CN2017/085778, filed May 24, 2017, which claims priority to Chinese Patent Application No. 201610666277.7, filed Aug. 12, 2016, both of which are hereby incorporated by reference in their entireties.

FIELD

The present invention relates to the field of communications, and particularly to a method and device for transmitting a synchronization signal, and a method and device for detecting a synchronization signal.

BACKGROUND

In the existing Long Term Evolution (LTE) systems, frame structures are defined respectively for the Frequency Division Duplex (FDD) and Time Division Duplex (TDD) modes.

The Frame Structure type 1 (FS1) is applicable to an LTE FDD system, and as illustrated in FIG. 1A, there are different carrier frequencies and same frame structure for uplink and downlink transmission. A radio frame with a length of 10 ms includes ten 1 ms sub-frames, and each sub-frame includes two 0.5 ms slots. A Transmission Time Interval (TTI) for uplink and downlink data transmission is 1 ms.

The Frame Structure Type 2 (FS2) is applicable to an LTE TDD system, and as illustrated in FIG. 1B, there are different sub-frames or slots at the same frequency for uplink and downlink transmission. Each 10 ms radio frame includes two 5 ms half-frames and each half-frame includes five sub-frames with a length of 1 ms. The sub-frames in the FS2 are categorized into three categories: downlink sub-frames, uplink sub-frames, and special sub-frames, and each special sub-frame includes three components, which are a Downlink Pilot Time Slot (DwPTS), a Guard Period (GP), and an Uplink Pilot Time Slot (UpPTS). Each half-frame includes at least one downlink sub-frame, at least one uplink sub-frame and at most one special sub-frame. Seven TDD uplink-downlink configurations as depicted in Table 1 are defined for different downlink-to-uplink switch-point periodicities and uplink-downlink allocation proportions.

TABLE 1

| Uplink-downlink configurations. | | | | | | | | | | |
| --- | --- | --- | --- | --- | --- | --- | --- | --- | --- | --- |
| Uplink-downlink configuration | Downlink-to-Uplink Switch-point periodicity | Sub-frame number | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Two Cyclic Prefix (CP) types including a normal CP and an extended CP are defined for the FDD and TDD modes in the LTE system (they are defined for a normal sub-frame, but the number of symbols in a special sub-frame is less than that definition below). For uplink transmission, a sub-carrier spacing $\Delta f=15$ kHz is defined. With a normal CP, each slot includes seven Single Carrier-Frequency Division Multiple Access (SC-FDMA) symbols, where the CP length of the first SC-FDMA symbol is 160 Ts, and the CP length of each of the other SC-FDMA symbols is 144 Ts: and with an extended CP, each slot includes six SC-FDMA symbols, and the CP length of each SC-FDMA symbol is 512 Ts. For downlink transmission, with a normal CP, a sub-carrier spacing $\Delta f=15$ kHz is defined, and each slot includes seven OFDM symbols, where the CP length of the first OFDM symbol is 160 Ts, and the CP length of each of the other OFDM symbols is 144 Ts; and with an extended CP, two sub-carrier spacing $\Delta f=15$ kHz and $\Delta f=7.5$ kHz is defined. With the sub-carrier spacing $\Delta f=15$ kHz each slot includes six OFDM symbols, and the CP length of each OFDM symbol is 512 Ts, and with the sub-carrier spacing $f=7.5$ kHz, each slot includes three OFDM symbols, and the CP length of each OFDM symbol is 1024 Ts, where Ts is a system sampling interval defined as 307200*Ts=10 ms. $\Delta f=7.5$ kHz is only applicable to a multicast service, and only applicable to a configured Multimedia Broadcast multicast service Single Frequency Network (MBSFN) sub-frame.

In an LTE system, a User Equipment (UE) (also referred to as a terminal) to access an LTE network shall search for a cell by firstly detecting a synchronization signal, and then obtaining system information of the cell. There is only one numerology, i.e., a sub-carrier spacing $\Delta f=15$ kHz, for the UE to detect a synchronization signal, and to receive broadcast information and system information, where the sub-carrier spacing corresponds to a fixed number of OFDM symbols and a fixed CP length for a normal CP and an extended CP respectively, so it is not necessary for the UE to identify the numerology. As there is a varying demand for a mobile communication service, the International Telecommunication Union (ITU), the 3GPP and other organizations come to research a new wireless communication system (e.g., a 5G system). The new wireless communication system can operate in a higher frequency band, but also can operate in lower and intermediate frequency bands for backward compatibility. Different numerologies shall be defined for the different frequency bands due to their different transmission characteristics and demands. Also different numerologies may be applicable to the same frequency band or Transmission and Reception Point (TRP) with a varying demand.

In summary, a plurality of numerologies will be defined in the new wireless communication system, but there has been absent so far a definite solution to detecting a synchronization signal by a terminal.

SUMMARY

Embodiments of the invention provide a method and device for transmitting a synchronization signal, and a method and device for detecting a synchronization signal so as to address the problem in the prior art that a plurality of numerologies will be defined in a new wireless communication system, but there has been absent so far a definite solution to detecting a synchronization signal by a terminal.

In a first aspect, there is provided a method for detecting a synchronization signal, the method including: determining, by a terminal, a numerology for detecting the synchronization signal; and detecting, by the terminal, the synchronization signal according to the determined numerology.

In a possible implementation, determining, by the terminal, the numerology for detecting the synchronization signal includes: determining, by the terminal, one or more predefined numerologies as the numerology or numerologies for detecting the synchronization signal; or determining, by the terminal, one or more numerologies supported or defined by a communication system as the numerology or numerologies for detecting the synchronization signal; or determining, by the terminal, a numerology corresponding to a frequency band currently detected by the terminal according to a correspondence relationship between a frequency band and a numerology, and determining the determined numerology as the numerology for detecting the synchronization signal.

Furthermore, if there are a plurality of determined numerologies, then detecting, by the terminal, the synchronization signal according to the determined numerology includes: detecting blindly, by the terminal, the synchronization signal according to each of the determined numerologies.

In a possible implementation, the method further includes: detecting, by the terminal, the synchronization signal over a predefined time domain resource and/or frequency domain resource.

Further to any one of the embodiments above, after the terminal detects the synchronization signal according to the determined numerology, the method further includes: determining, by the terminal, a Transmission and Reception Point (TRP) group to which the terminal belongs according to the detected synchronization signal; or determining, by the terminal, a sub-band, a TRP, and/or a beam for the terminal to reside in or access, according to a correspondence relationship between a synchronizations signal, and a sub-band, a TRP, and/or a beam.

Furthermore, determining, by the terminal, the Transmission and Reception Point (TRP) group to which the terminal belongs according to the detected synchronization signal includes: selecting, by the terminal, a synchronization signal with the highest signal strength from detected synchronization signals; determining, by the terminal, a TRP group ID corresponding to the selected synchronization signal according to a correspondence relationship between a synchronization signal and a TRP group ID; and determining, by the terminal, a TRP group corresponding to the determined TRP group ID as the TRP group to which the terminal belongs.

In a second aspect, there is provided a method for transmitting a synchronization signal, the method including: determining, by a network-side device, a numerology for transmitting the synchronization signal; and transmitting, by the network-side device, the synchronization signal according to the determined numerology.

In a possible implementation, determining, by the network-side device, the numerology for transmitting the synchronization signal includes: determining, by the network-side device, one or more predefined numerologies as the numerology or numerologies for transmitting the synchronization signal; or, determining, by the network-side device, one or more numerologies supported or defined by a communication system as the numerology or numerologies for transmitting the synchronization signal; or, determining, by the network-side device, a numerology corresponding to a frequency band currently used by the network-side device for transmitting, according to a correspondence relationship between a frequency band and a numerology, and determining the determined numerology as the numerology for transmitting the synchronization signal.

Furthermore, if there are a plurality of determined numerologies, then the transmitting, by the network-side device, the synchronization signal according to the determined numerology includes: selecting, by the network-side device, one of the determined numerologies, and transmitting the synchronization signal according to the selected numerology.

In a possible implementation, the method further includes: transmitting, by the network-side device, the synchronization signal over a predefined time domain resource and/or frequency domain resource.

Further to any one of the embodiments above, the synchronization signal is used for determining a Transmission and Reception Point (TRP) group to which the terminal belongs; or there is a correspondence relationship between the synchronization signal and a sub-band or a TRP or a beam, where the synchronization signal is used for determining a sub-band, a TRP, and/or a beam in which the terminal resides or accesses.

In a third aspect, there is provided a terminal including: a numerology determining module configured to determine a numerology for detecting a synchronization signal; and a detecting module configured to detect the synchronization signal according to the determined numerology.

In a possible implementation, the numerology determining module is configured to: determine one or more predefined numerologies as the numerology or numerologies for detecting the synchronization signal; or determine one or more numerologies supported or defined by a communication system as the numerology or numerologies for detecting the synchronization signal; or determine a numerology corresponding to a frequency band currently detected by the terminal according to a correspondence relationship between a frequency band and a numerology, and determine the determined numerology as the numerology for detecting the synchronization signal.

Furthermore, if there are a plurality of determined numerologies, then the detecting module is configured to detect blindly the synchronization signal according to each of the determined numerologies.

In a possible implementation, the detecting module is configured to detect the synchronization signal over a predefined time domain resource and/or frequency domain resource.

Further to any one of the embodiments above, the detecting module is further configured to: determine a Transmission and Reception Point (TRP) group to which the terminal belongs according to the detected synchronization signal; or determine a sub-band, a TRP, and/or a beam for the terminal to reside in or access, according to a correspondence relationship between a synchronizations signal, and a sub-band, a TRP, and/or a beam.

Furthermore, the detecting module is configured to: select a synchronization signal with the highest signal strength from detected synchronization signals; determine a TRP group ID corresponding to the selected synchronization signal according to a correspondence relationship between a synchronization signal and a TRP group ID; and determine a TRP group corresponding to the determined TRP group ID as the TRP group to which the terminal belongs.

In a fourth aspect, there is provided a terminal including a transceiver, and at least one processor connected with the transceiver, where the processor is configured to read and execute programs in a memory to: determine a numerology for detecting a synchronization signal, and detect the synchronization signal according to the determined numerology; and the transceiver is configured to receive and transmit data under the control of the processor.

In a possible implementation, the processor is configured to read and execute the programs in the memory to: determine one or more predefined numerologies as the numerology or numerologies for detecting the synchronization signal; or determine one or more numerologies supported or defined by a communication system as the numerology or numerologies for detecting the synchronization signal; or determine a numerology corresponding to a frequency band currently detected by the terminal according to a correspondence relationship between a frequency band and a numerology, and determine the determined numerology as the numerology for detecting the synchronization signal.

Furthermore, if there are a plurality of determined numerologies, then the processor is configured to read and execute the programs in the memory to detect blindly the synchronization signal according to each of the determined numerologies.

In a possible implementation, the processor is further configured to read and execute the programs in the memory to detect the synchronization signal over a predefined time domain resource and/or frequency domain resource.

Further to any one of the embodiments above, the processor is configured to read and execute the programs in the memory to: determine a Transmission and Reception Point (TRP) group to which the terminal belongs according to the detected synchronization signal; or determine a sub-band, a TRP, and/or a beam for the terminal to reside in or access, according to a correspondence relationship between a synchronizations signal, and a sub-band, a TRP, and/or a beam.

Furthermore, the processor is configured to read and execute the programs in the memory to: select a synchronization signal with the highest signal strength from detected synchronization signals; determine a TRP group ID corresponding to the selected synchronization signal according to a correspondence relationship between a synchronization signal and a TRP group ID; and determine a TRP group corresponding to the determined TRP group ID as the TRP group to which the terminal belongs.

In a fifth aspect, there is provided a network-side device including: a determining module configured to determine a numerology for transmitting a synchronization signal; and a transmitting module configured to transmit the synchronization signal according to the determined numerology.

In a possible implementation, the determining module is configured to: determine one or more predefined numerologies as the numerology or numerologies for transmitting the synchronization signal; or determine one or more numerologies supported or defined by a communication system as the numerology or numerologies for transmitting the synchronization signal; or determine a numerology corresponding to a frequency band currently used by the network-side device for transmitting, according to a correspondence relationship between a frequency band and a numerology, and determine the determined numerology as the numerology for transmitting the synchronization signal.

Furthermore, if there are a plurality of determined numerologies, then the transmitting module is configured to select one of the determined numerologies, and to transmit the synchronization signal according to the selected numerology.

In a possible implementation, the transmitting module is configured to transmit the synchronization signal over a predefined time domain resource and/or frequency domain resource.

In a possible implementation, the synchronization signal is used for determining a Transmission and Reception Point (TRP) group to which the terminal belongs; or there is a correspondence relationship between the synchronization signal and a sub-band or a TRP or a beam, where the synchronization signal is used for determining a sub-band, a TRP, and/or a beam in which the terminal resides or accesses.

In a sixth aspect, there is provided a network-side device including a transceiver, and at least one processor connected with the transceiver, where the processor is configured to read and execute programs in a memory to: determine a numerology for transmitting a synchronization signal, and transmit the synchronization signal through the transceiver according to the determined numerology; and the transceiver is configured to receive and transmit data under the control of the processor.

In a possible implementation, the processor is configured to read and execute the programs in the memory to: determine one or more predefined numerologies as the numerology or numerologies for transmitting the synchronization signal; or determine one or more numerologies supported or defined by a communication system as the numerology or numerologies for transmitting the synchronization signal; or determine a numerology corresponding to a frequency band currently used by the network-side device for transmitting, according to a correspondence relationship between a frequency band and a numerology, and determine the determined numerology as the numerology for transmitting the synchronization signal.

Furthermore, if there are a plurality of determined numerologies, then the processor is configured to read and execute the programs in the memory to select one of the determined numerologies, and to transmit the synchronization signal through the transceiver according to the selected numerology.

In a possible implementation, the processor is configured to read and execute the programs in the memory to transmit the synchronization signal through the transceiver over a predefined time domain resource and/or frequency domain resource.

In a possible implementation, the synchronization signal is used for determining a Transmission and Reception Point (TRP) group to which the terminal belongs; or there is a correspondence relationship between the synchronization signal and a sub-band or a TRP or a beam, where the synchronization signal is used for determining a sub-band, a TRP, and/or a beam in which the terminal resides or accesses.

In a seventh aspect, there is provided a computer readable storage medium storing executable program codes configured to perform the method according to the first aspect.

In an eighth aspect, there is provided a computer readable storage medium storing executable program codes configured to perform the method according to the second aspect.

In the methods and devices according to the embodiments of the invention, before a terminal detects a synchronization signal, it firstly determines a numerology for detecting the synchronization signal, and then detects the synchronization signal according to the determined numerology, so that a numerology for transmitting a synchronization signal in a future communication system supporting a plurality of numerologies can be identified to thereby detect a synchronization signal correctly.

DETAILED DESCRIPTION OF THE EMBODIMENTS

Figure 1A:
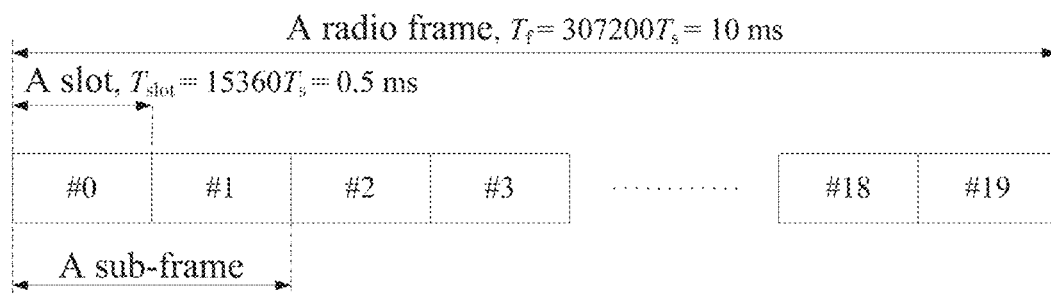
FIG. 1A is a schematic diagram of a frame structure type 1 in an LTE FDD system.
Figure 1B:
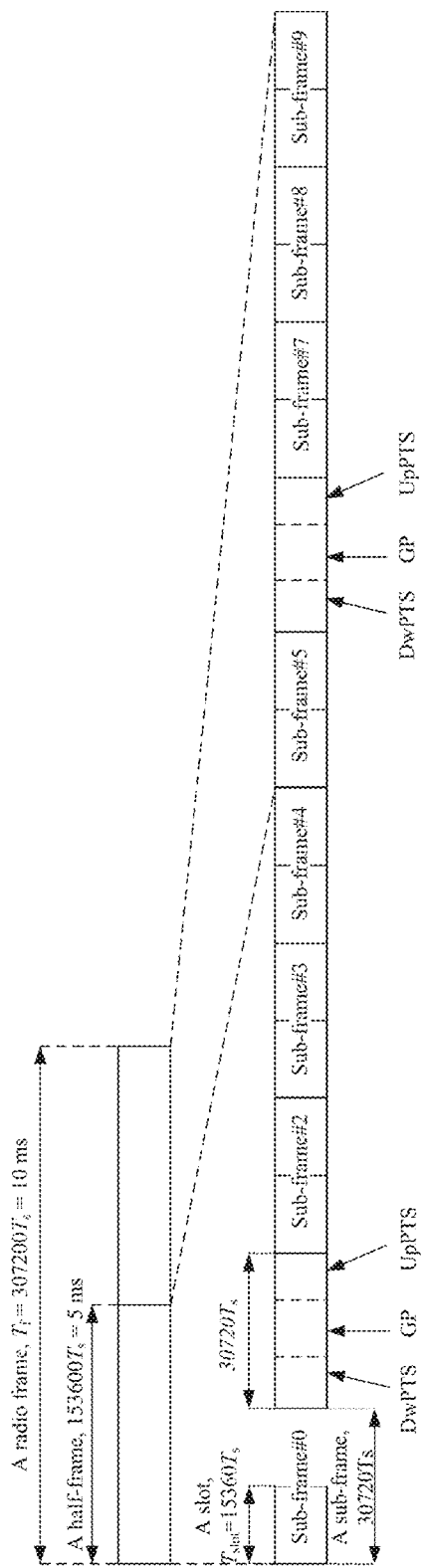
FIG. 1B is a schematic diagram of a frame structure type 2 in an LTE FDD system.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Firstly, a plurality of technical terms as referred to in the embodiments of the invention will be explained.

In the embodiments of the invention, TRPs deployed in a communication system are grouped into a plurality of TRP groups, for example, according to System Information Areas (SIAs), that is, an SIA is a TRP group, and each TRP group is characterized as follows.

There is a separate TRP group ID of the TRP group.

There is a group-specific synchronization signal, e.g., an initial synchronization signal, in the TRP group, where the synchronization signal is applicable to all the TRPs in the TRP group or the System Information Area (SIA).

There is group-specific system information in the TRP group, where the system information can also be referred to as necessary system information including information necessary to residing in/accessing the TRP group, and can be particularly represented as a Master Information Block (MIB) and a System Information Block (SIB), that is, the system information is configuration information applicable to all the TRPs in the TRP group or the SIA.

A terminal in an idle state can reside in the TRP group.

The TRP group can include at least one TRP/beam, where if the TRP group includes a plurality of TRPs/beams, then the different TRPs/beams can be synchronous or asynchronous with each other.

In the embodiments of the invention, the TRP/beam is characterized as follows.

There is an ID of each TRP, and if one TRP includes a plurality of beams, then there will be an ID of each beam.

Each ID corresponds to one or more synchronization signal sequences, e.g., one or more access synchronization signals, for identifying the ID.

A transmission bandwidth of each TRP/beam can be the entire system bandwidth, or a part of frequency domain resources in the system bandwidth, e.g., one or more sub-bands in the system bandwidth.

Each TRP/beam may use different numerologies over different frequency domain resources in a transmission bandwidth of the TRP/beam, and/or, each TRP/beam may use different numerologies over different time domain resources in a transmission bandwidth of the TRP/beam.

In the embodiments of the invention, the numerology includes but will not be limited to at least one of an OFDM symbol length, a CP length, or a sub-carrier spacing.

"A or the plurality of", etc., as referred to in the embodiments of the invention refer to two or more than two; and "/" represents "and/or", where "and/or" describes three possible associative relationships of associated objects, and for example, A and/or B represents three instances of A alone, both A and B, and B alone.

The embodiments of the invention will be described below in further details with reference to the drawings. It shall be appreciated that the embodiments to be described below are only intended to illustrate and explain the invention, but not to limit the invention thereto.

Figure 2A:
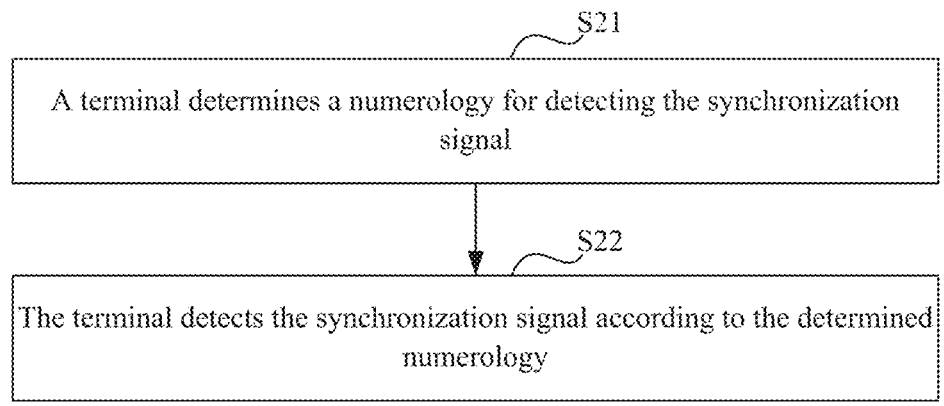
FIG. 2A is a schematic diagram of a method for detecting a synchronization signal according to an embodiment of the invention.

FIG. 2A illustrates a method for detecting a synchronization signal according to an embodiment of the invention, where the method includes the following operations.

In the operation S21, a terminal determines a numerology for detecting the synchronization signal.

In the operation S22, the terminal detects the synchronization signal according to the determined numerology.

In the embodiment of the invention, before the terminal detects a synchronization signal, the terminal firstly determines the numerology for detecting the synchronization signal, and further detects the synchronization signal according to the determined numerology, so that a numerology for transmitting a synchronization signal in a future communication system supporting a plurality of numerologies can be identified to thereby detect a synchronization signal correctly.

In the embodiment of the invention, the synchronization signal includes but will not be limited to at least one of a Primary Synchronization Signal (PSS), a Secondary Synchronization Signal (SSS), or a sub-band detection signal.

In the embodiment of the invention, the synchronization signal includes one or more of an initial synchronization signal or an access synchronization signal.

Here the initial synchronization signal is used for determining a TRP group to which the terminal belongs, and the initial synchronization signal can include only one synchronization signal, e.g., a synchronization signal 1; or can include a plurality of synchronization signals, e.g., a synchronization signal 1 and a synchronization signal 2.

The access synchronization signal is used for determining a sub-band, a TRP, and/or a beam in which the terminal resides, or the access synchronization signal is used for determining a sub-band, a TRP, and/or a beam accessed by the terminal. The access synchronization signal can include only one synchronization signal, e.g., a synchronization signal 3, or can include a plurality of synchronization signals, e.g., a synchronization signal 3 and a synchronization signal 4.

Further to any one of the embodiments above, the terminal determines the numerology for detecting the synchronization signal in the operation S12 in the following several possible implementations.

In a first implementation, the terminal determines one or more predefined numerologies as the numerology or numerologies for detecting the synchronization signal.

In this implementation, the terminal always detects the synchronization signal according to the predefined numerology or numerologies. For example, the terminal always detects the synchronization signal according to a sub-carrier spacing 15 KHz, and a symbol length, a CP length, and other parameters corresponding to the sub-carrier spacing 15 KHz.

In this implementation, if there are a plurality of predefined numerologies, then the terminal will detect blindly the synchronization signal according to each of the predefined numerologies.

In a second implementation, the terminal determines one or more numerologies supported or defined by a communication system as the numerology or numerologies for detecting the synchronization signal.

In this implementation, if there are a plurality of numerologies supported or defined by the communication system, then the terminal will detect blindly the synchronization signal according to each of the numerologies.

In a third implementation, the terminal determines a numerology corresponding to a frequency band currently detected by the terminal according to a correspondence relationship between a frequency band and a numerology, and determines the determined numerology as the numerology for detecting the synchronization signal.

For example, a numerology 1 and a numerology 2 are defined for a frequency band 1, and a numerology 3 is defined for a frequency band 2; in another example, a numerology 1 is defined for a frequency band 1, a numerology 2 is defined for a frequency band 2, and a numerology 3 is defined for a frequency band 3; etc.

Here a possible definition of three numerologies is as depicted in Table 2:

Another possible implementation of a correspondence relationship between a frequency band and a numerology is as depicted in Table 4:

TABLE 4

| | Frequency band | |
|---|---|---|
| | Frequency band 1: below 6 GHz | Frequency band 2: 6 GHz and above |
| Numerology | Numerology 1, Numerology 2 | Numerology 3 |

In this implementation, if the terminal determines a plurality of numerologies corresponding to the frequency band currently detected by the terminal according to the correspondence relationship, then the terminal will detect blindly the synchronization signal according to each of the determined numerologies.

Further to any one of the embodiments above, the method further includes: the terminal detects the synchronization signal over a predefined time domain resource and/or frequency domain resource.

Particularly, the synchronization signal is transmitted over the predefined time domain resource and/or frequency domain resource, e.g., in central Y1 RBs or Y2 sub-carriers of a system bandwidth, and can be further transmitted at a predefined time domain position (e.g. a slot/a symbol) in a predefined radio frame.

Further to any one of the embodiments above, after the terminal detects the synchronization signal according to the determined numerology, the method further includes: the terminal determines a TRP group to which the terminal belongs according to the detected synchronization signal.

Here there is a correspondence relationship between an initial synchronization signal and a TRP group ID, and upon detecting an initial synchronization signal, the terminal can

TABLE 2

| | Set 1 (numerology 1) | Set 2 (numerology 2) | Set 3 (numerology 3) |
|---|---|---|---|
| Sub-carrier spacing | 15 kHz | 60 kHz | 240 kHz |
| Component Carrier Bandwidth (MHz) | 1.4, 3, 5, 10, 20 MHz | 20, 40, 80 MHz | 20, 40, 80, 160, 320 MHz |
| OFDM symbol length (μs) | 66.67 μs | 16.67 μs | 4.17 μs |
| Cyclic prefix | ~4.8 μs | ~1.2 μs | ~0.3 μs |
| The Number of OFDM Symbols per sub-frame | 1 | 4 | 16 |
| Sub-frame Length (ms) | 0.0715 ms | 0.0715 ms | 0.0713 ms |
| Frame Length (ms) | 10 ms | 10 ms | 10 ms |
| Note        FFT Size | 128, 256, 512, 1024, 2048 | 512, 1024, 2048 | 128, 256, 512, 1024, 2048 |

A possible implementation of a correspondence relationship between a frequency band and a numerology is as depicted in Table 3:

TABLE 3

| | Frequency band | | |
|---|---|---|---|
| | Frequency band 1: 2 GHz | Frequency band 2: 4 GHz~30 GHz | Frequency band 3: ≥30 GHz |
| Numerology | Numerology 1 | Numerology 2 | Numerology 3 | detect a TRP group ID corresponding to the detected initial synchronization signal according to the correspondence relationship, and thus be synchronized with a TRP group corresponding to the TRP group ID.

Particularly, the terminal determines the Transmission and Reception Point (TRP) group to which the terminal belongs according to the detected synchronization signal as follows: the terminal selects a synchronization signal with the highest signal strength from detected synchronization signals; the terminal determines a TRP group ID corresponding to the selected synchronization signal according to a correspondence relationship between a synchronization signal and a TRP group ID; and the terminal determines a TRP group corresponding to the determined TRP group ID as the TRP group to which the terminal belongs.

Further to any one of the embodiments above, after the terminal detects the synchronization signal according to the determined numerology, the method further includes: the terminal determines a synchronization relationship between the terminal and the TRP group to which the terminal belongs, according to the detected synchronization signal.

Here the synchronization relationship can be subsequently used for downlink reception in the TRP group, for example, to receive necessary system information of the TRP group, to detect an access synchronization signal, etc.

Further to any one of the embodiments above, after the terminal detects the synchronization signal according to the determined numerology, the method further includes: the terminal determines a numerology used by the detected synchronization signal as a numerology for subsequent operation of the terminal.

For example, the TRP group includes only one TRP, and the TRP transmits an initial synchronization signal, and after the terminal detects the initial synchronization signal, the terminal belongs to the TRP and is synchronized with the TRP in the downlink, and furthermore, the terminal operating in the TRP can operate directly according to the numerology corresponding to the detected initial synchronization signal.

In another example, the TRP group includes a plurality of TRPs/sub-bands/beams, and there is the same numerology of the respective TRPs/sub-bands/beams, so a predefined part or all of TRPs in the TRP group transmit initial synchronization signals, and after the terminal detects the initial synchronization signals, the terminal belongs to the TRP group and is synchronized with the TRP group in the downlink, and furthermore, the terminal accessing and operating in one of the TRPs in the TRP group can operate directly according to the numerology corresponding to the detected initial synchronization signal. For example, the terminal can detect an access synchronization signal directly according to the numerology corresponding to the detected initial synchronization signal, so that the terminal can select a TRP corresponding to an access synchronization signal with the highest signal strength, and belong to/reside in/access and further operate in the TRP, and can also further transmit data in the TRP using the numerology corresponding to the detected initial synchronization signal.

Further to any one of the embodiments above, after the terminal detects the synchronization signal according to the determined numerology, the method further includes: the terminal determines a sub-band, a TRP, and/or a beam for the terminal to reside in or access, according to a correspondence relationship between a synchronizations signal, and a sub-band, a TRP, and/or a beam.

Here there is a correspondence relationship between an access synchronization signal and a sub-band or a TRP or a beam, and when the terminal detects an access synchronization signal, it can determine a sub-band or a TRP or a beam corresponding to the detected access synchronization signal according to the correspondence relationship to thereby reside in or access, and transmit in, the sub-band or the TRP or the beam.

Furthermore, if the sub-band or the TRP or the beam for transmitting the access synchronization signal is not synchronous with the TRP transmitting the access synchronization signal in the TRP group, then the terminal may further detect the access synchronization signal to thereby be further synchronized with the sub-band or the TRP or the beam corresponding to the access synchronization signal.

Figure 2B:
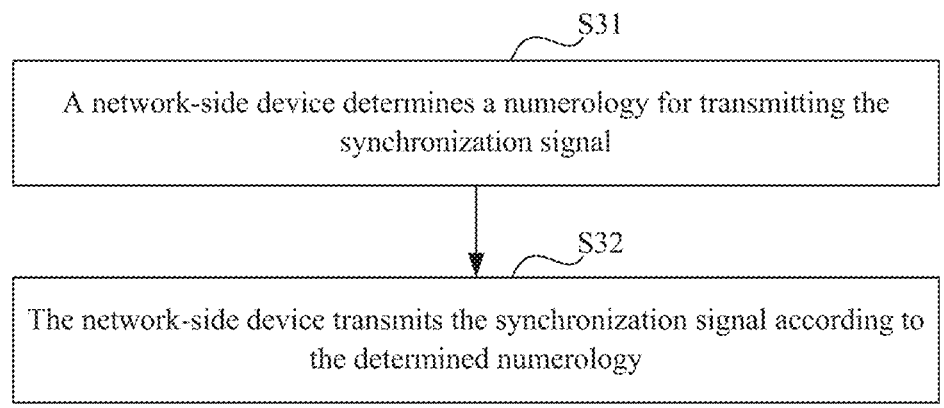
FIG. 2B is a schematic diagram of a method for transmitting a synchronization signal according to an embodiment of the invention.

FIG. 2B illustrates a method for transmitting a synchronization signal according to an embodiment of the invention, where the method includes the following operations.

In the operation S31, a network-side device determines a numerology for transmitting the synchronization signal.

In the operation S32, the network-side device transmits the synchronization signal according to the determined numerology.

In the embodiment of the invention, the network-side device determines the numerology for transmitting the synchronization signal as follows: the network-side device determines one or more predefined numerologies as the numerology or numerologies for transmitting the synchronization signal; or, the network-side device determines one or more numerologies supported or defined by a communication system as the numerology or numerologies for transmitting the synchronization signal; or, the network-side device determines a numerology corresponding to a frequency band currently used by the network-side device for transmitting, according to a correspondence relationship between a frequency band and a numerology, and determines the determined numerology as the numerology for transmitting the synchronization signal.

Furthermore, if there are a plurality of determined numerologies, then the network-side device will transmit the synchronization signal according to the determined numerology as follows: the network-side device selects one of the determined numerologies, and transmits the synchronization signal according to the selected numerology.

In a possible implementation, the method further includes: the network-side device transmits the synchronization signal over a predefined time domain resource and/or frequency domain resource.

Further to any one of the embodiments above, the synchronization signal is used for determining a Transmission and Reception Point (TRP) group to which the terminal belongs; or there is a correspondence relationship between the synchronization signal and a sub-band or a TRP or a beam, where the synchronization signal is used for determining a sub-band, a TRP, and/or a beam in which the terminal resides or accesses.

A method for transmitting and detecting a synchronization signal according to an embodiment of the invention will be described below in details in connection with three particular embodiments thereof.

Figure 3:
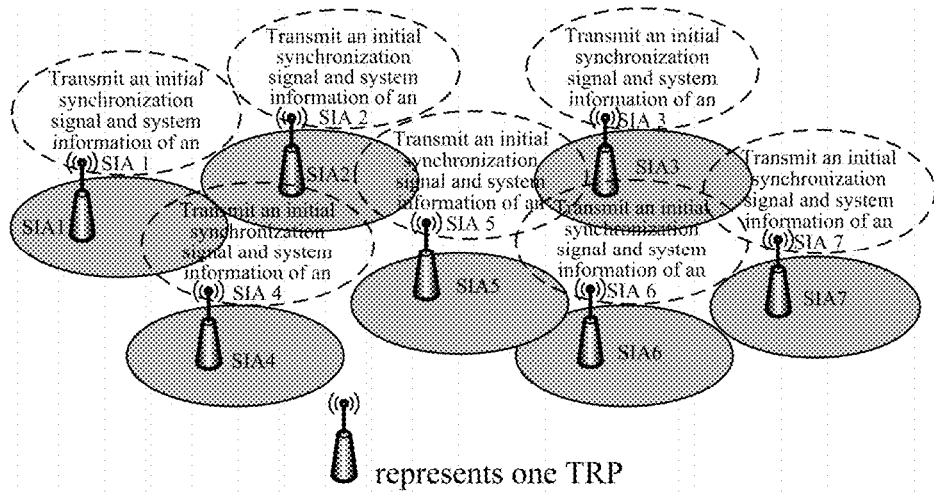
FIG. 3 is a schematic diagram of an application scenario according to a first embodiment of the invention.

The first embodiment: this embodiment is applicable to a scenario as illustrated in FIG. 3, where each System Information Area (SIA) corresponds to one TRP group, each TRP group includes only one TRP, and each TRP transmits a synchronization signal and system information separately. The terminal to access or to reside in any one of the TRPs firstly detects an initial synchronization signal (i.e., a synchronization signal 1 and/or a synchronization signal 2), where the initial synchronization signal can be predefined at a fixed position in a system bandwidth, e.g., at the center of the system bandwidth, so that it can determine the frequency domain position of the system bandwidth based upon the frequency domain position of the initial synchronization signal after obtaining the system bandwidth, and of course, the time domain transmission position of the initial synchronization signal can be further predefined so that a temporal boundary, e.g., a radio frame/sub-frame/symbol boundary, can be determined when the initial synchronization signal is detected blindly.

The terminal can detect an initial synchronization signal as follows. [00117] 1) The terminal can detect an initial synchronization signal according to a default numerology, and for example, the default numerology is a sub-carrier spacing 15 kHz, and the length of an OFDM symbol, a CP, a sub-frame (or a min-frame), etc., defined at the sub-carrier spacing, and if a plurality of initial synchronization signal sequences are detected, then the terminal will select an initial synchronization signal sequence with the highest detected strength as a detected initial synchronization signal.

[00118] 2) The terminal can alternatively detect blindly an initial synchronization signal according to a plurality of numerologies supported in a communication system, and for example, firstly detect an initial synchronization signal according to a sub-carrier spacing 15 kHz and a corresponding parameter at the sub-carrier spacing, and then detect an initial synchronization signal according to a sub-carrier spacing 60 kHz and a corresponding parameter at the sub-carrier spacing, and if more numerologies are defined, then the terminal will further proceed with the other numerologies, and select an initial synchronization signal at a numerology with the highest detected strength as a detected initial synchronization signal. [00119] 3) The terminal can alternatively determine a numerology corresponding to the frequency band currently detected by the terminal, according to a predefined correspondence relationship between a frequency band and a numerology, and detect an initial synchronization signal according to the determined numerology; and for example, if the current frequency band is a frequency band 1, and the frequency band 1 corresponds to a numerology 1 in Table 3, then the terminal will detect an initial synchronization signal according to the numerology 1, or if the frequency band 1 corresponds to a numerology 1 and a numerology 2 in Table 4, then the terminal will detect blindly an initial synchronization signal respectively according to the numerology 1 and the numerology 2, and select an initial synchronization signal at a numerology with the highest detected strength as a detected initial synchronization signal.

In this embodiment, the terminal determines a TRP corresponding to the detected initial synchronization signal based upon the initial synchronization signal, and a correspondence relationship between an initial synchronization signal and a TRP ID, performs an initial synchronization and then reads system information transmitted in the TRP to thereby perform a subsequent communication process.

Figure 4:
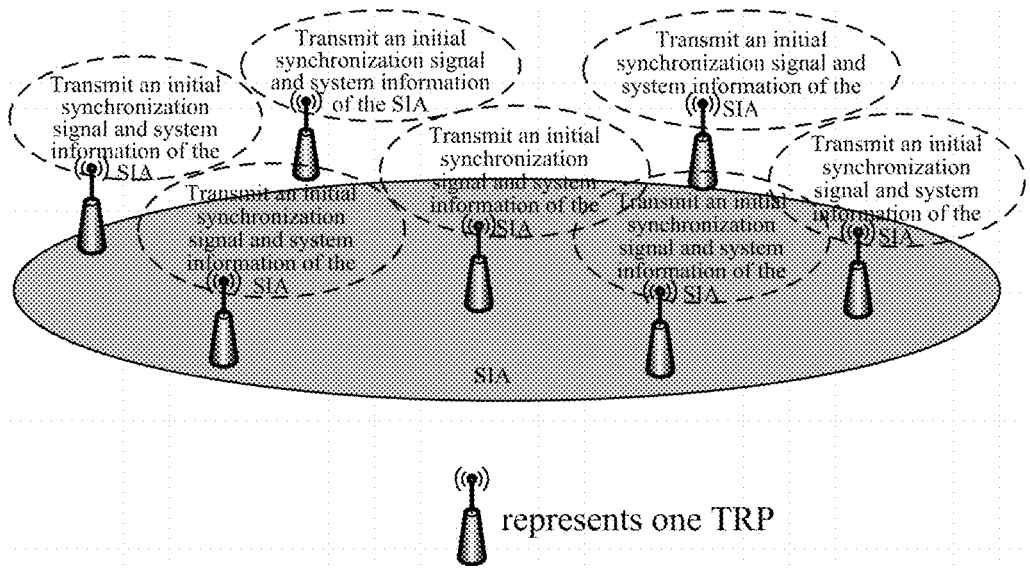
FIG. 4 is a schematic diagram of an application scenario according to a second embodiment of the invention.

The second embodiment: this embodiment is applicable to a scenario as illustrated in FIG. 4, where one SIA corresponds to one TRP group, each TRP group includes a plurality of TRPs, the plurality of TRPs may or may not be synchronous with each other, and a part or all of the TRPs transmit the same initial synchronization signal and system information. The terminal to access or to reside in a TRP group firstly detects an initial synchronization signal, particularly in the same process as in the first embodiment (a repeated description thereof will be omitted here), performs synchronization with one TRP group, and then reads system information transmitted in the TRP group.

In this embodiment, the terminal determines a TRP group corresponding to the detected initial synchronization signal based upon the initial synchronization signal, and a correspondence relationship between an initial synchronization signal and a TRP group ID, performs an initial synchronization, and then reads system information transmitted in the TRP group to thereby perform a subsequent communication process.

Figure 5:
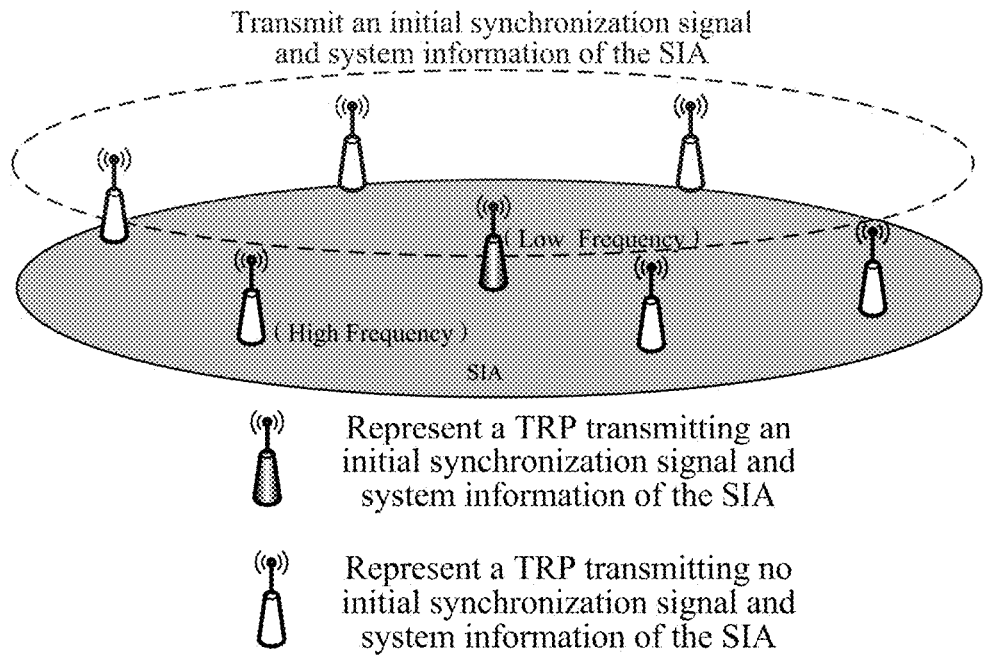
FIG. 5 is a schematic diagram of an application scenario according to a second embodiment of the invention.

The third embodiment: this embodiment is applicable to a scenario as illustrated in FIG. 5, where one SIA corresponds to one TRP group, each TRP group includes a plurality of TRPs, the plurality of TRPs may or may not be synchronous with each other, and a part of the TRPs operate in a high frequency band while the other TRPs operate in a low frequency band. An initial synchronization signal is transmitted in a part or all of the TRPs in only one of the frequency bands, or in a part or all of the TRPs in both of the low and high frequency bands, and the TRPs participating in the initial synchronization signal transmission transmit the same initial synchronization signal.

The terminal to access or to reside in a TRP group firstly detects an initial synchronization signal. The initial synchronization signal can be predefined at a fixed position of a system bandwidth, e.g., the center of the system bandwidth, so that the terminal determines the frequency domain position of the system bandwidth based upon the frequency domain position of the initial synchronization signal after obtaining the system bandwidth. And of course, the time domain transmission position of the initial synchronization signal can be further predefined so that a temporal boundary, e.g., a radio frame/sub-frame/symbol boundary, can be determined when the initial synchronization signal is detected blindly.

In this embodiment, the terminal needs to detect the two frequency bands for an initial synchronization signal.

For example, the terminal can always firstly detect an initial synchronization signal in the low frequency band by default, particularly in the same process as in the second embodiment (a repeated description thereof will be omitted here), and if an initial synchronization signal is detected, then the terminal will be synchronized with the low frequency band, and then receive system information transmitted by the TRP group in the low frequency band; or if the terminal does not detect any initial synchronization signal in the low frequency band, then it will detect an initial synchronization signal in the high frequency band, be synchronized with the high frequency band, and then receive system information transmitted by the TRP group in the high frequency band.

In another example, the terminal can alternatively detect an initial synchronization signal in both of the low and high frequency bands, particularly in the same process as in the second embodiment, select and be synchronized with the frequency band with a high signal strength, and then receive system information transmitted by the TRP group in that frequency band.

In still another example, for a terminal supporting only some frequency band, the terminal can detect an initial synchronization signal only in the supported frequency band, particularly in the same process as in the second embodiment (a repeated description thereof will be omitted here), be synchronized in the downlink, and then receive system information transmitted in the frequency band.

In any one of the embodiments above, the initial synchronization signal can include only one synchronization signal, e.g., a synchronization signal 1, or can include a plurality of synchronization signals, e.g., a synchronization signal 1 and a synchronization signal 2.

In any one of the embodiments above, an initial synchronization signal is replaced with an access synchronization signal, e.g., a synchronization signal 3, or a synchronization signal 3 and a synchronization signal 4, and an access synchronization signal can be detected in the same way as an initial synchronization signal except that a time domain position and/or a frequency domain position at which an access synchronization signal is detected can be predefined, or can be indicated in system information after an initial synchronization signal is detected and the system information is received, or can be obtained as a result of blind detection in a system bandwidth.

The processing flows of the methods above can be performed in software programs, the software programs can be stored in a storage medium, and when the stored software programs are invoked, they can perform the operations in the methods above.

Based upon the same inventive idea, an embodiment of the invention further provides a terminal, and since the terminal addresses the problem under a similar principle to the method according to the embodiment as illustrated in FIG. 2A above, reference can be made to the related description in the implementation of the method for an implementation of the terminal, and a repeated description thereof will be omitted here.

Figure 6:
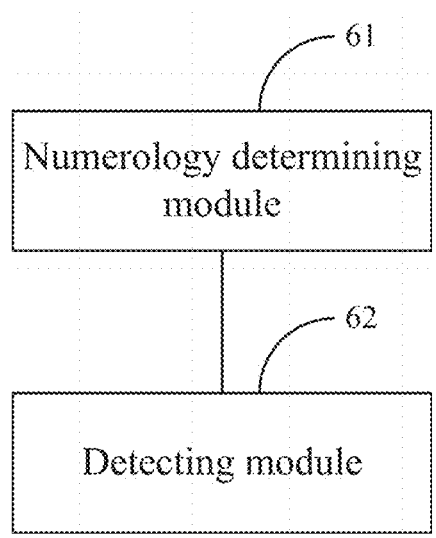
FIG. 6 is a schematic diagram of a terminal according to an embodiment of the invention.

FIG. 6 illustrates a terminal according to an embodiment of the invention, where the terminal includes: a numerology determining module 61 configured to determine a numerology for detecting a synchronization signal; and a detecting module 62 configured to detect the synchronization signal according to the determined numerology.

In a possible implementation, the numerology determining module 61 is configured to: determine one or more predefined numerologies as the numerology or numerologies for detecting the synchronization signal; or determine one or more numerologies supported or defined by a communication system as the numerology or numerologies for detecting the synchronization signal; or determine a numerology corresponding to a frequency band currently detected by the terminal according to a correspondence relationship between a frequency band and a numerology, and determine the determined numerology as the numerology for detecting the synchronization signal.

In a possible implementation, if there are a plurality of determined numerologies, then the detecting module is configured to detect blindly the synchronization signal according to each of the determined numerologies.

In a possible implementation, the detecting module is configured to detect the synchronization signal over a predefined time domain resource and/or frequency domain resource.

In a possible implementation, the detecting module is further configured to: determine a Transmission and Reception Point (TRP) group to which the terminal belongs according to the detected synchronization signal; or determine a sub-band, a TRP, and/or a beam for the terminal to reside in or access, according to a correspondence relationship between a synchronizations signal, and a sub-band, a TRP, and/or a beam.

In a possible implementation, the detecting module is configured to: select a synchronization signal with the highest signal strength from detected synchronization signals; determine a TRP group ID corresponding to the selected synchronization signal according to a correspondence relationship between a synchronization signal and a TRP group ID; and determine a TRP group corresponding to the determined TRP group ID as the TRP group to which the terminal belongs.

Figure 7:
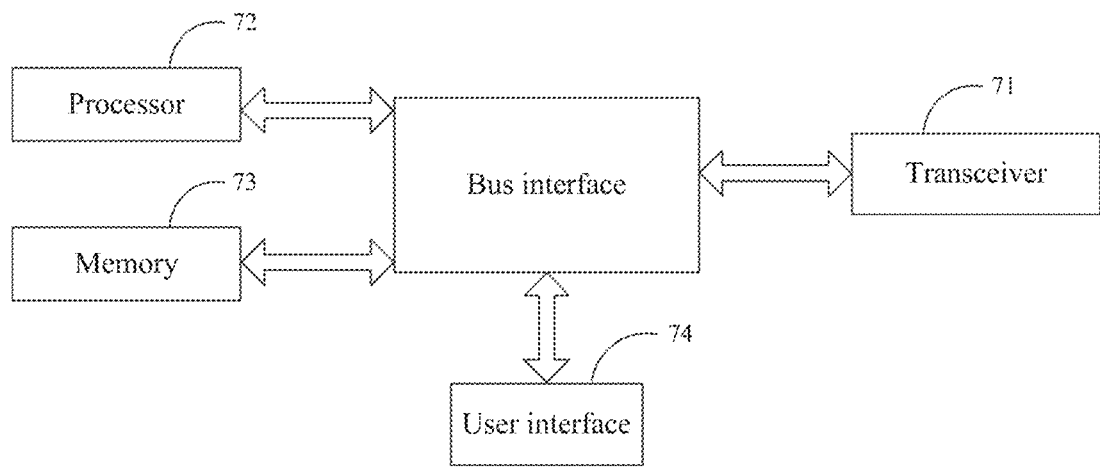
FIG. 7 is a schematic diagram of another terminal according to an embodiment of the invention.

FIG. 7 illustrates another terminal according to an embodiment of the invention, where the terminal includes a transceiver 71, and at least one processor 72 connected with the transceiver 71, where the processor 72 is configured to read and execute programs in a memory 73 to: determine a numerology for detecting a synchronization signal; and detect the synchronization signal according to the determined numerology; and the transceiver 71 is configured to receive and transmit data under the control of the processor 72.

In FIG. 7, the bus architecture can include any number of interconnecting buses and bridges to particularly link together various circuits including one or more processors represented by the processor 72, and one or more memories represented by the memory 73. The bus architecture can further link together various other circuits, e.g., a peripheral device, a manostat, a power management circuit, etc., all of which are well known in the art, so a further description thereof will be omitted in this context. The bus interface serves as an interface. The transceiver 71 can be a number of elements, e.g., a transmitter and a receiver, which are units for communication with various other devices over a transmission medium. For different user equipment, the user interface 74 can also be an interface via which devices are connected internally and externally as needed, and the connected devices include but will not be limited to a keypad, a monitor, a speaker, a microphone, a joystick, etc. The processor 72 is responsible for managing the bus architecture and performing normal processes, and the memory 73 can store data for use by the processor 72 in performing the operations.

Optionally, the processor 72 can be a Central Processing Unit (CPU), an Application Specific Integrated Circuit (ASIC), a Field Programmable Gate Array (FPGA), or a Complex Programmable Logic Device (CPLD).

In a possible implementation, the processor 72 is configured to read and execute the programs in the memory 73 to: determine one or more predefined numerologies as the numerology or numerologies for detecting the synchronization signal; or determine one or more numerologies supported or defined by a communication system as the numerology or numerologies for detecting the synchronization signal or determine a numerology corresponding to a frequency band currently detected by the terminal according to a correspondence relationship between a frequency band and a numerology, and determine the determined numerology as the numerology for detecting the synchronization signal.

In a possible implementation, if there are a plurality of determined numerologies, then the processor 72 is configured to read and execute the programs in the memory 73 to detect blindly the synchronization signal according to each of the determined numerologies.

In a possible implementation, the processor 72 is configured to read and execute the programs in the memory 73 to detect the synchronization signal over a predefined time domain resource and/or frequency domain resource.

In a possible implementation, the processor 72 is further configured to read and execute the programs in the memory 73 to: determine a Transmission and Reception Point (TRP) group to which the terminal belongs according to the detected synchronization signal; or determine a sub-band, a TRP, and/or a beam for the terminal to reside in or access, according to a correspondence relationship between a synchronizations signal, and a sub-band, a TRP, and/or a beam.

In a possible implementation, the processor 72 is configured to read and execute the programs in the memory 73 to: select a synchronization signal with the highest signal strength from detected synchronization signals; determine a TRP group ID corresponding to the selected synchronization signal according to a correspondence relationship between a synchronization signal and a TRP group ID; and determine a TRP group corresponding to the determined TRP group ID as the TRP group to which the terminal belongs.

Based upon the same inventive idea, an embodiment of the invention provides a network-side device, and since the device addresses the problem under a similar principle to the method above according to the embodiment as illustrated in FIG. 2B, reference can be made to the implementation of the method for an implementation of the device, and a repeated description thereof will be omitted here.

Figure 8:
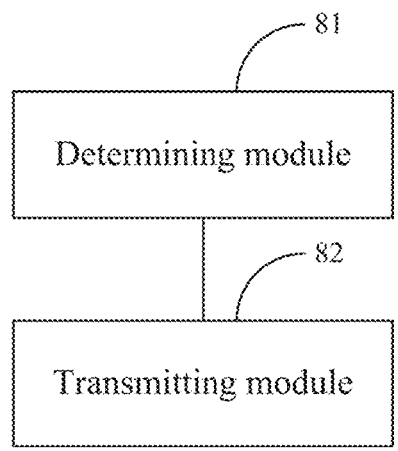
FIG. 8 is a schematic diagram of a network-side device according to an embodiment of the invention.

FIG. 8 illustrates a network-side device according to an embodiment of the invention, where the network-side device includes: a determining module 81 configured to determine a numerology for transmitting a synchronization signal; and a transmitting module 82 configured to transmit the synchronization signal according to the determined numerology.

In a possible implementation, the determining module 81 is configured to: determine one or more predefined numerologies as the numerology or numerologies for transmitting the synchronization signal; or determine one or more numerologies supported or defined by a communication system as the numerology or numerologies for transmitting the synchronization signal; and or determine a numerology corresponding to a frequency band currently used by the network-side device for transmitting, according to a correspondence relationship between a frequency band and a numerology, and determine the determined numerology as the numerology for transmitting the synchronization signal.

In a possible implementation, if there are a plurality of determined numerologies, then the transmitting module 82 is configured to select one of the determined numerologies, and to transmit the synchronization signal according to the selected numerology.

In a possible implementation, the transmitting module 82 is configured to transmit the synchronization signal over a predefined time domain resource and/or frequency domain resource.

Figure 9:
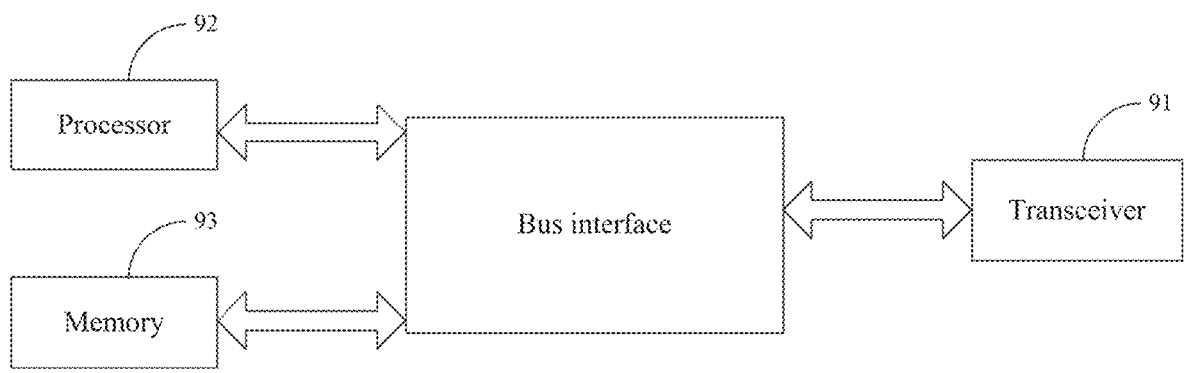
FIG. 9 is a schematic diagram of another network-side device according to an embodiment of the invention.

FIG. 9 illustrates another network-side device according to an embodiment of the invention, where the network-side device includes a transceiver 91, and at least one processor 92 connected with the transceiver 91, where the processor 92 is configured to read and execute programs in a memory 93 to: determine a numerology for transmitting a synchronization signal; and transmit the synchronization signal through the transceiver 91 according to the determined numerology; and the transceiver 91 is configured to receive and transmit data under the control of the processor 92.

Here in FIG. 9, the bus architecture can include any number of interconnecting buses and bridges to particularly link together various circuits including one or more processors represented by the processor 92, and one or more memories represented by the memory 93. The bus architecture can further link together various other circuits, e.g., a peripheral device, a manostat, a power management circuit, etc., all of which are well known in the art, so a further description thereof will be omitted in this context. The bus interface serves as an interface. The transceiver 91 can be a number of elements, e.g., a transmitter and a receiver, which are units for communication with various other devices over a transmission medium. The processor 92 is responsible for managing the bus architecture and performing normal processes, and the memory 93 can store data for use by the processor 92 in performing the operations.

Optionally, the processor 92 can be a CPU, an ASIC, an FPGA, or a CPLD.

In a possible implementation, the processor 92 is configured to read and execute the programs in the memory 93 to: determine one or more predefined numerologies as the numerology or numerologies for transmitting the synchronization signal; or determine one or more numerologies supported or defined by a communication system as the numerology or numerologies for transmitting the synchronization signal; or determine a numerology corresponding to a frequency band currently used by the network-side device for transmitting, according to a correspondence relationship between a frequency band and a numerology, and determine the determined numerology as the numerology for transmitting the synchronization signal.

In a possible implementation, if there are a plurality of determined numerologies, then the processor 92 is configured to read and execute the programs in the memory 93 to select one of the determined numerologies, and to transmit the synchronization signal through the transceiver 91 according to the selected numerology.

In a possible implementation, the processor 92 is configured to read and execute the programs in the memory 93 to transmit the synchronization signal through the transceiver over a predefined time domain resource and/or frequency domain resource.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for detecting a synchronization signal, the method comprising:
    determining, by a terminal, a numerology for detecting the synchronization signal; and
    detecting, by the terminal, the synchronization signal according to the determined numerology;
    wherein after the terminal detects the synchronization signal according to the determined numerology, the method further comprises:
    method 1: determining, by the terminal, a Transmission and Reception Point (TRP) group to which the terminal belongs according to the detected synchronization signal; or
    method 2: determining, by the terminal, a TRP for the terminal to reside in or access, according to a correspondence relationship between the detected synchronizations signal and a TRP;
    wherein the method 1 and the method 2 comprise:
    selecting, by the terminal, a synchronization signal with a highest signal strength from detected synchronization signals; and
    determining, by the terminal, a TRP group Identity (ID) corresponding to the selected synchronization signal according to a correspondence relationship between a synchronization signal and a TRP group ID.

2. The method according to claim 1, wherein the method further comprises:
    detecting, by the terminal, the synchronization signal over a predefined time domain resource; or
    detecting, by the terminal, the synchronization signal over a predefined frequency domain resource; or
    detecting, by the terminal, the synchronization signal over a predefined time domain resource and a frequency domain resource.

3. The method according to claim 1, wherein determining, by the terminal, the numerology for detecting the synchronization signal comprises:
    determining, by the terminal, one or more predefined numerologies as the numerology or numerologies for detecting the synchronization signal; or
    determining, by the terminal, one or more numerologies supported or defined by a communication system as the numerology or numerologies for detecting the synchronization signal; or
    determining, by the terminal, a numerology corresponding to a frequency band currently detected by the terminal according to a correspondence relationship between a frequency band and a numerology, and determining the determined numerology as the numerology for detecting the synchronization signal.

4. The method according to claim 3, wherein if there are a plurality of determined numerologies, then detecting, by the terminal, the synchronization signal according to the determined numerology comprises:
    detecting blindly, by the terminal, the synchronization signal according to each of the determined numerologies.

5. The method according to claim 1, wherein after the terminal determines the TRP group Identity (ID) corresponding to the selected synchronization signal according to the correspondence relationship between the synchronization signal and the TRP group ID, the method 1 further comprises:
    determining, by the terminal, a TRP group corresponding to the determined TRP group ID as the TRP group to which the terminal belongs.

6. A terminal, comprising at least one processor and a memory; wherein the memory is configured to store readable program codes, and the at least one processor is configured to execute the readable program codes to:
    determine a numerology for detecting a synchronization signal; and
    detect the synchronization signal according to the determined numerology;
    wherein the at least one processor is further configured to execute the readable program codes to perform:
    method 1: determine a Transmission and Reception Point (TRP) group to which the terminal belongs according to the detected synchronization signal; or
    method 2: determine a TRP for the terminal to reside in or access, according to a correspondence relationship between the detected synchronizations signal and a TRP;
    wherein, for the method 1 and method 2, the at least one processor is further configured to execute the readable program codes to perform:
    select a synchronization signal with a highest signal strength from detected synchronization signals; and
    determine a TRP group Identity (ID) corresponding to the selected synchronization signal according to a correspondence relationship between a synchronization signal and a TRP group ID.

7. The terminal according to claim 6, wherein the at least one processor is further configured to execute the readable program codes to:
    detect the synchronization signal over a predefined time domain resource, or
    detect the synchronization signal over a predefined frequency domain resource, or
    detect the synchronization signal over a predefined time domain resource and a frequency domain resource.

8. The terminal according to claim 6, wherein the at least one processor is further configured to execute the readable program codes to:
    determine one or more predefined numerologies as the numerology or numerologies for detecting the synchronization signal; or
    determine one or more numerologies supported or defined by a communication system as the numerology or numerologies for detecting the synchronization signal; or
    determine a numerology corresponding to a frequency band currently detected by the terminal according to a correspondence relationship between a frequency band and a numerology, and determine the determined numerology as the numerology for detecting the synchronization signal.

9. The terminal according to claim 8, wherein if there are a plurality of determined numerologies, then the at least one processor is further configured to execute the readable program codes to:

detect blindly the synchronization signal according to each of the determined numerologies.

10. The terminal according to claim 6, wherein, for the method 1, after determine the TRP group Identity (ID) corresponding to the selected synchronization signal according to the correspondence relationship between the synchronization signal and the TRP group ID, the at least one processor is further configured to execute the readable program codes to perform:

determine a TRP group corresponding to the determined TRP group ID as the TRP group to which the terminal belongs.

* * * * *